(12) United States Patent
Momtaz

(10) Patent No.: US 7,839,161 B2
(45) Date of Patent: Nov. 23, 2010

(54) LOW-JITTER HIGH-FREQUENCY CLOCK CHANNEL

(75) Inventor: Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/555,564

(22) Filed: Sep. 8, 2009

(65) Prior Publication Data

US 2010/0182045 A1 Jul. 22, 2010

Related U.S. Application Data

(60) Provisional application No. 61/146,506, filed on Jan. 22, 2009.

(51) Int. Cl.
*H03K 17/16* (2006.01)
(52) U.S. Cl. .............................. 326/21; 326/93; 333/12
(58) Field of Classification Search .................. 326/21, 326/26, 82, 97, 101; 257/207, 208; 333/12, 333/243, 244
See application file for complete search history.

(56) References Cited

U.S. PATENT DOCUMENTS 7,173,327 B2 * 2/2007 Siniaguine .................. 257/691

* cited by examiner

*Primary Examiner*—Don P Le
(74) *Attorney, Agent, or Firm*—Brake Hughes Bellermann LLP

(57) ABSTRACT

According to one general aspect, an apparatus may include a clock channel, a shielding tunnel, and clock repeaters. In various embodiments, the clock channel may be configured to carry the clock signal, and may include a portion of a metal layer of an integrated circuit. In some embodiments, the shielding tunnel may be configured to shield, in at least four directions, the clock channel from other signals, and may include portions of a at least three metal layers of the integrated circuit. The shielding tunnel may be connected to the positive and negative supplies in order to provide the required power for the clock repeaters.

20 Claims, 6 Drawing Sheets

100

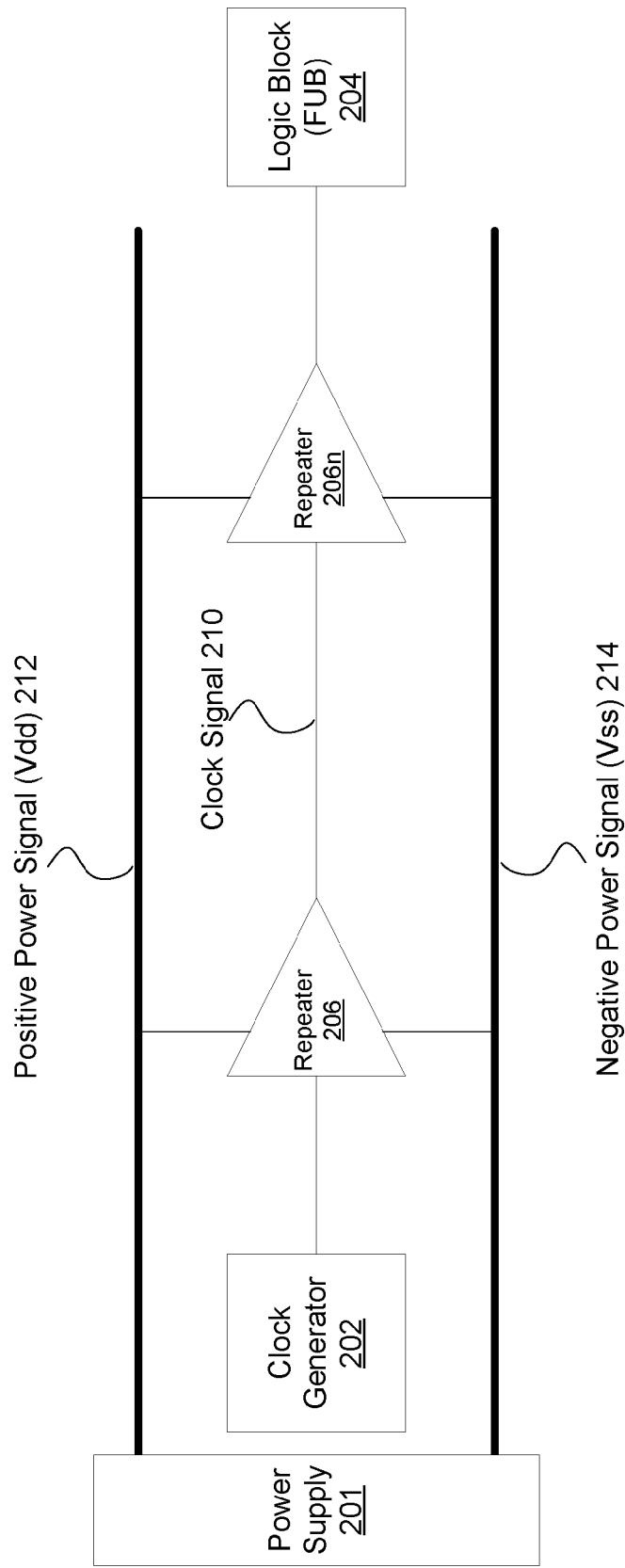

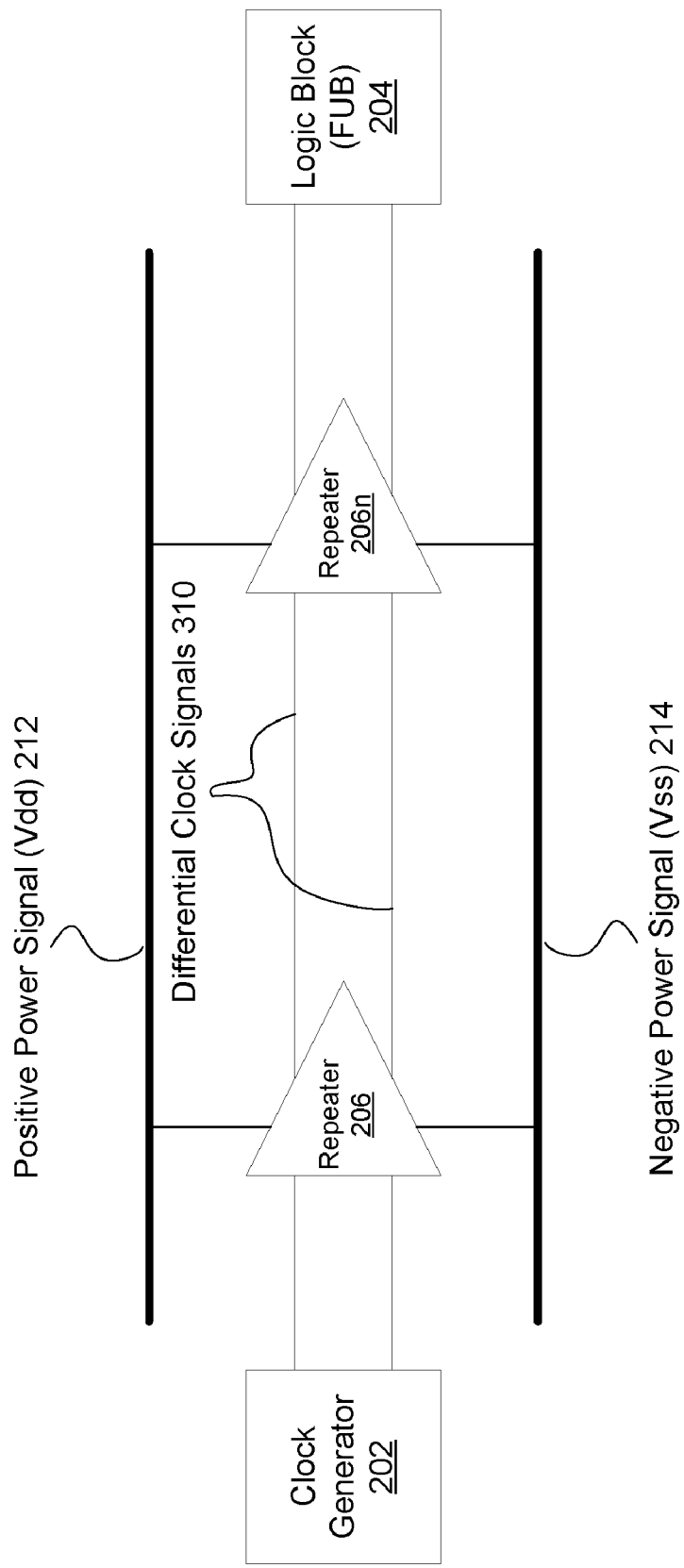

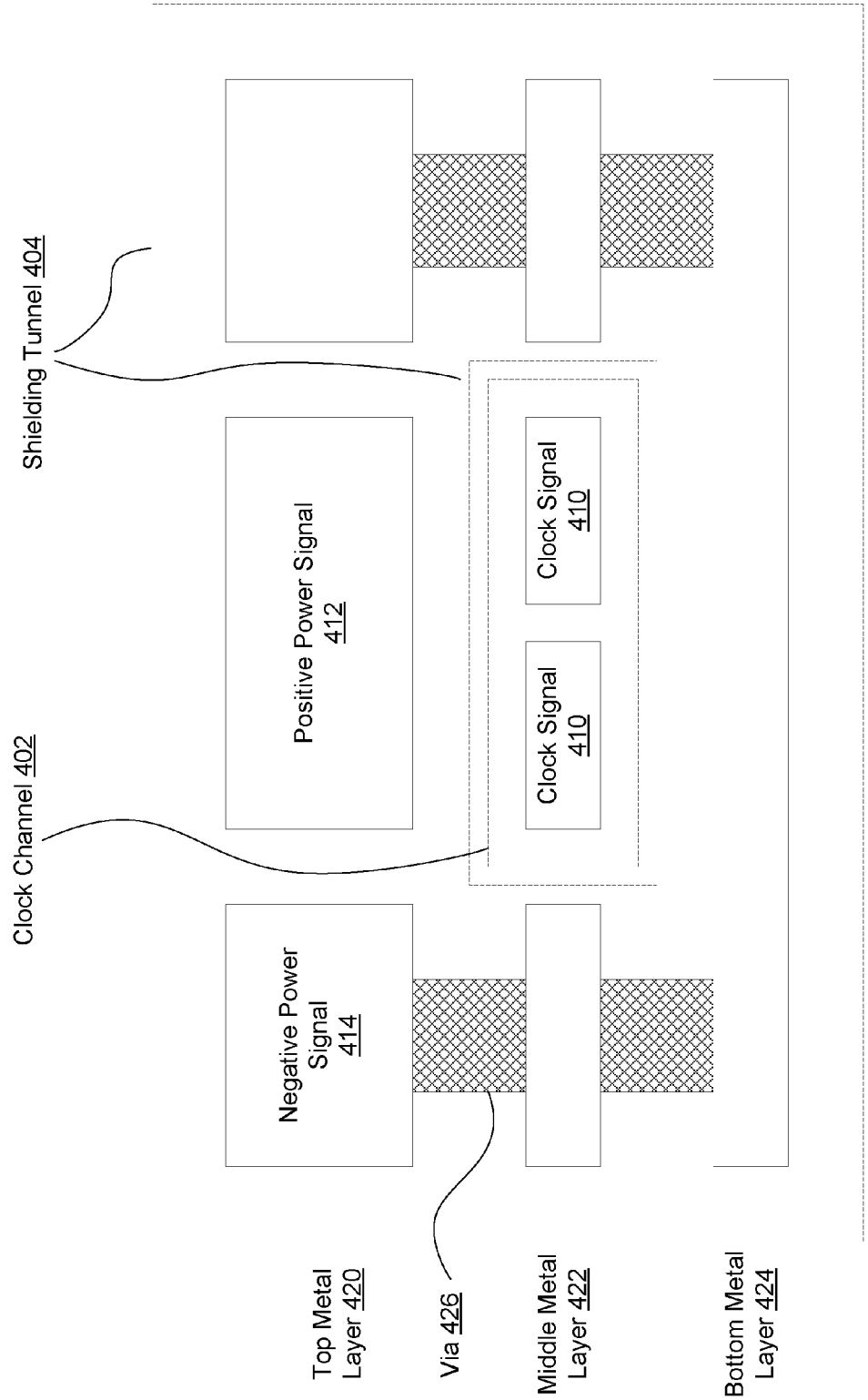

FIG. 5
500
502 Transmitting a clock signal, along a clock channel, to at least one logic block
504 Transmitting at least two power signals, along a shielding tunnel
506 Retransmitting, by at least one clock repeater, the clock signal, wherein the clock repeater is powered by the transmitted power signals

LOW-JITTER HIGH-FREQUENCY CLOCK CHANNEL

CROSS-REFERENCE TO RELATED APPLICATION

This application claims priority under 35 U.S.C. §119 to U.S. Provisional Patent Application 61/146,506, filed Jan. 22, 2009, titled "LOW-JITTER HIGH-FREQUENCY CLOCK CHANNEL," which is incorporated herein by reference in its entirety.

TECHNICAL FIELD

This description relates to clock distribution, and more specifically to clock and power distribution.

BACKGROUND

Generally, a clock signal includes a signal used to coordinate the actions of two or more circuits. Frequently, a clock signal oscillates between a high and a low state, normally with a 50% duty cycle, and is usually in the form of a square wave. A clock distribution network, generally, distributes the clock signal(s) from a common point to all the elements or components that need or make use it. Since this distribution function is often vital to the operation of a synchronous system or circuit, much attention has been given to the characteristics of these clock signals and the electrical networks used in their distribution.

Clock signals are typically operate at the highest speeds of any signal, either control or data, within the entire synchronous system and, due to the clock's wide usage, typically also includes the greatest capacitive loading and signal fan-out. Since data signals are often provided with a temporal reference in the form of the clock signal, the clock signal's waveform must frequently be particularly clean and sharp.

One of the measures of clock, or waveform in general, consistency and control is jitter. Jitter is frequently an unwanted variation of one or more characteristics of a periodic signal in electronics and telecommunications. Jitter may be seen in characteristics such as the interval between successive pulses, or the amplitude, frequency, or phase of successive cycles. For clock jitter, there are three commonly used metrics: absolute jitter, period jitter, and cycle to cycle jitter. Cycle to cycle jitter is generally the difference in length of any two adjacent clock periods. Although, it is understood that the above is merely one illustrative example to which the disclosed subject matter is not limited.

SUMMARY

According to one general aspect, an apparatus may include a clock channel and a shielding tunnel. In various embodiments, the clock channel may be configured to carry the clock signal, and may include a portion of a metal layer of an integrated circuit. In some embodiments, the shielding tunnel may be configured to shield, in at least four directions, the clock channel from other signals, and may include portions of a at least three metal layers of the integrated circuit.

According to another general aspect, a method may include transmitting a clock signal, along a clock channel, to at least one logic block. In various embodiments, the method may also include transmitting at least two power signals, along a shielding tunnel, wherein the shielding tunnel is configured to shield the clock signal from electrical interference. In some embodiments, the method may include retransmitting, by at least one clock repeater, the clock signal, wherein the clock repeater is powered by the transmitted power signals.

According to another general aspect, an integrated circuit comprising a clock generator, a plurality of logic blocks, a plurality of clock repeaters, a clock channel, and a shielding tunnel. In various embodiments, the clock generator may be configured to generate a clock signal. In some embodiments, the plurality of logical blocks may be configured to perform synchronous logic operations, and employ the clock signal to synchronize the logic operations. In various embodiments, the plurality of clock repeaters may be configured to receive the clock signal and retransmit the clock signal with increased power. In one embodiment, the clock channel configured to carry a clock signal. In some embodiments, the shielding tunnel may be configured to shield, in at least four directions, the clock channel from other electrical interference, and may provide power to the clock repeaters.

The details of one or more implementations are set forth in the accompanying drawings and the description below. Other features will be apparent from the description and drawings, and from the claims.

A system and/or method for clock distribution, substantially as shown in and/or described in connection with at least one of the figures, as set forth more completely in the claims.

BRIEF DESCRIPTION OF THE DRAWINGS

FIG. 2 is a block diagram of an example embodiment of an apparatus in accordance with the disclosed subject matter.

FIG. 3 is a block diagram of an example embodiment of an apparatus in accordance with the disclosed subject matter.

FIG. 5 is a flow chart of an example embodiment of a technique in accordance with the disclosed subject matter.

DETAILED DESCRIPTION

Figure 1:
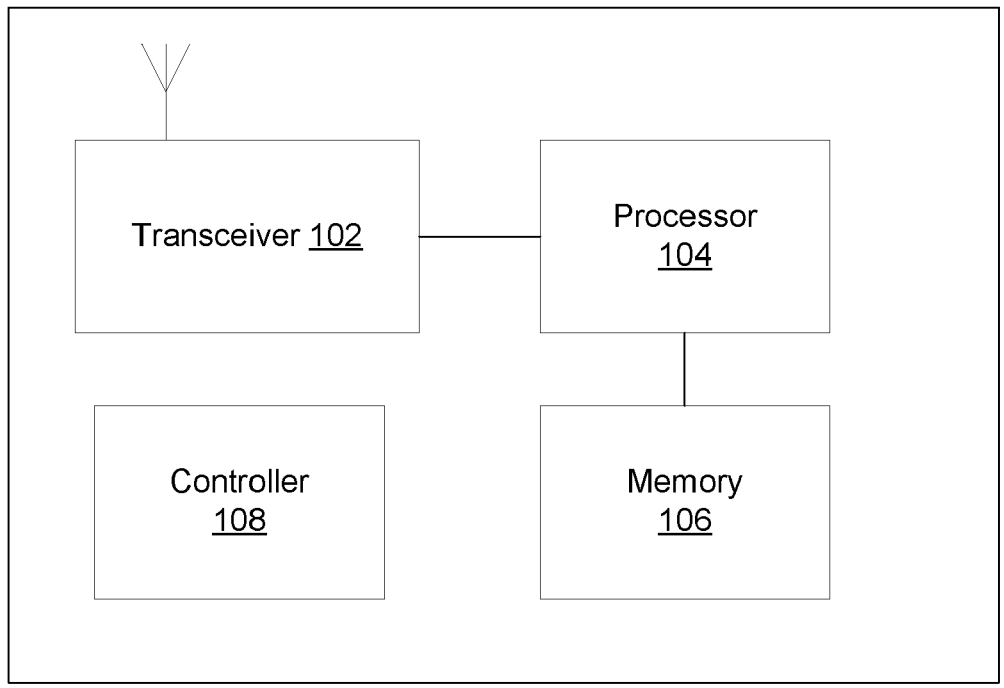
FIG. 1 is a block diagram of an example embodiment of an apparatus in accordance with the disclosed subject matter.

FIG. 1 is a block diagram of an example embodiment of a system or apparatus 100 in accordance with the disclosed subject matter. The apparatus or system 100 (e.g., a mobile phone, a smart phone, a mobile station, a laptop, a computer, etc.) may include, for example, a transceiver 102, including a transmitter to transmit signals and a receiver to receive signals, a processor or baseband processor 104 to execute instructions or software and control transmission and receptions of signals, and a memory 106 to store data and/or instructions.

In some embodiments, the transceiver 102 may include a wireless transceiver configured to operate based upon a wireless networking standard (e.g., WiMAX, WiFi, WLAN, etc.). In other embodiments, the transceiver 102 may include a wired transceiver configured to operate based upon a wired networking standard (e.g., Ethernet, optical, etc.).

In various embodiments, the memory 106 may include permanent (e.g., compact disc, etc.), semi-permanent (e.g., a hard drive, etc.), and/or temporary (e.g., volatile random access memory, etc.) memory. In various embodiments, the memory may include a storage medium, as described below.

Processor 104 may also make decisions or determinations, generate frames or messages for transmission, decode received frames or messages for further processing, and other tasks or functions described herein. Processor 104, which may be a baseband processor, for example, may generate messages, packets, frames or other signals for transmission via transceiver 102. Processor 104 may control transmission of signals or messages over a network, and may receive signals or messages, etc., via a network (e.g., after being downconverted by transceiver 102, for example). Processor 104 may be programmable and capable of executing software, firmware, or other instructions stored in memory or on other computer media to perform the various tasks and functions described above, such as one or more of the tasks or methods described above. Processor 104 may be (or may include), for example, hardware, programmable logic, a programmable processor that executes software or firmware, and/or any combination of these. Using other terminology, processor 104 and transceiver 102 together may be considered as a transmitter/receiver system, for example.

In addition, a controller (or processor) 108 may execute software and instructions, and may provide overall control for the system 100, and may provide control for other systems not shown in FIG. 1, such as controlling input/output devices (e.g., display, keypad), and/or may execute software for one or more applications that may be provided on system 100, such as, for example, a network protocol encoding/decoding, a packet forwarding decision including an order or priority for packet processing, rules enforcement for packet modification/adaptation/filtering, or other application or software.

In addition, a storage medium may be provided that includes stored instructions and/or data, which when executed/processed by a controller or processor may result in the processor 104, or other controller or processor, performing one or more of the functions or tasks described above.

In various embodiments, all or some elements of the apparatus 100 may be provided on an integrated circuit (IC). In some embodiments, all or some elements of the apparatus 100 may be included in a system-on-a-chip (SOC) in which all or most of the components of the system are integrated into a single IC. In another embodiment, all or some elements of the apparatus 100 may be included in a system-in-a-package (SIP) in which multiple chips are used but integrated into a single package or module.

FIG. 2 is a block diagram of an example embodiment of an apparatus 200 in accordance with the disclosed subject matter. In various embodiments, the apparatus 200 may include a clock generator 202, a clock signal 210, and at least one logic block or functional unit block (FUB) 204.

In various embodiments, the clock generator 202 may be configured to generate a clock signal 210. In various embodiments, the clock generator 202 may include a phase-lock loop (PLL) or other clock generation means. In one embodiment, the clock signal 210 may be feedback into the clock generator 202 to improve the generation of future cycles of the clock signal 210. In various embodiments, the clock generator 202 may be configured to generate a plurality of clocks operating at, for example, different frequencies, power or voltage levels, duty cycles, etc. Although, it is understood that the above are merely a few illustrative examples to which the disclosed subject matter is not limited.

In various embodiments, the logic block(s) 204 may include synchronous circuits or logic elements (e.g., flip-flops, latches, etc.) which receive or employ the clock signal 210 to perform operations. In some embodiments, these logic blocks 204 may perform various functions. These functions are not generally germane to the disclosed subject matter but may include, for example, memory operations, arithmetic, decision making, etc.; although, it is understood that the above are merely a few illustrative examples to which the disclosed subject matter is not limited.

In various embodiments, the clock signal 210 may be transmitted to at least one logic block 204. In some embodiments, the clock signal 210 may be configured to oscillate and provide a timing mechanism to one or more synchronous circuits or elements of the logic block(s) 204. In one embodiment, the clock signal 210 may be distributed or transmitted via a clock distribution system, network, or tree (e.g., an H-tree, etc.). It is understood that, while the clock distribution network of FIG. 2 is illustrated as the single straight line of clock signal 210, a clock distribution network may include a plurality of branches or fans, a number of directions (even three-dimensional changes in direction), and a number of lengths (e.g., as each logic block 204 is a difference distance for the clock generator 202, etc.). In various embodiments, the clock signal 210 may be transmitted via a clock channel, as described below.

In various embodiments, the clock distribution network may include a number of repeaters 206 (two repeaters 206 and 206n are illustrated). A repeater in this context may include an electronic device that receives a signal (e.g., the clock signal 210) and retransmits the signal at a higher level and/or higher power. Often, repeaters are used to break a long transmission line (and therefore a large capacitive or resistive load) into a plurality of shorter transmission lines. In various embodiments, a repeater is often a pair of inverter elements (e.g., the Boolean NOT function) placed back-to-back; therefore, retransmitting the signal without inversion.

In various embodiments, the repeaters 206 may require a power source to function. In various embodiments, this power source may be provided by the positive power signal (Vdd) 212 and the negative power signal (Vss) 214.

In various embodiments, the power signals 212 and 214 may be generated or transmitted by a power supply 201. In such an embodiment, the power supply 201 may receive the power signals 212 and 214 from another device or source, and retransmit them within the apparatus 200. In various embodiments, the apparatus 200 may not include the power supply 201.

In various embodiments, the positive power signal 212 may be configured to provide a positive or higher (relative to the negative power signal 214) voltage source to the repeaters 206, and, in some embodiments, one or more of the logic blocks 204. Likewise, in various embodiments, the negative power signal 214 may be configured to provide a negative or lower (relative to the positive power signal 212) voltage source to the repeaters 206, and, in some embodiments, one or more of the logic blocks 204. In various embodiments, these power signals 212 and 214 may be transmitted via a shielding tunnel, as described below.

FIG. 3 is a block diagram of an example embodiment of an apparatus 300 in accordance with the disclosed subject matter. In various embodiments, the apparatus 300 may include a clock generator 202, and one or more logic blocks 204.

In various embodiments, the clock generator 202 may be configured to generate a pair of differential clock signals 310. In such an embodiment, differential clock signals 310 may include a method of transmitting information or a signal (e.g., the clock) electrically by means of two complementary signals sent on or via two separate wires.

In various embodiments, the clock generator 202 may be configured to generate the differential clock signals 310 using or employing a current-mode logic (CML) buffer included in the clock generator 202. In various embodiments, this CML buffer may drive the entire or a portion of the clock distribution network. Although, it is understood that the above is merely one illustrative example to which the disclosed subject matter is not limited.

In some embodiments, the CML buffer of the clock generator 202 may drive the clock signals 310 a fixed distance (e.g., 1000 microns (μm), etc.) until a repeater 206 repeats or drives the clock signals 310 another fixed distance (e.g., 1000 microns), and so on until the clock signals 310 reach the logic block 204. In such an embodiment, the repeaters 206 may include a CML buffer. Although, it is understood that the above is merely one illustrative example to which the disclosed subject matter is not limited.

In various embodiments, the power signals 212 and 214 may be routed to shield (at least partially) the clock signals 310 from electrical interference. In some embodiments, this may include employing a shielding tunnel to route the power signals 212 and 214, while the clock signals 310 are routed in a clock channel within the shielding tunnel, as described below.

In one embodiment, the clock signal(s) 310 or 210 of FIG. 2 may have a frequency of at least one gigahertz (1 GHz); although, it is understood that the above is merely one illustrative example to which the disclosed subject matter is not limited. In such an embodiment, the power signals 212 and 214 may shield the clock signal 310 such that the clock signal 310 only experiences a channel-induced or clock distribution network-induced clock jitter of less than 40 pico-seconds (ps) peak-to-peak per 20 millimeters (mm) of clock channel traveled by the clock signal.

Figure 4B:
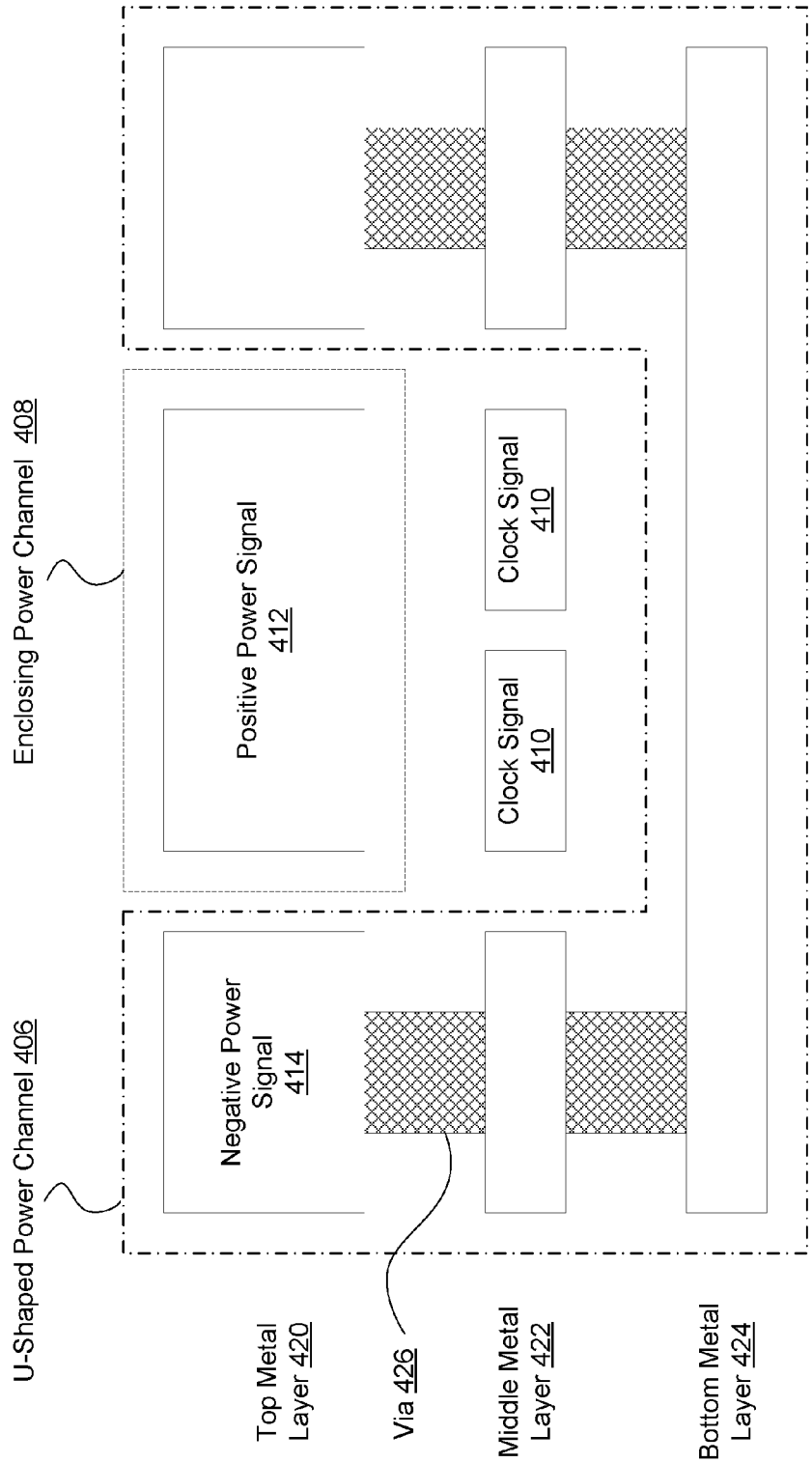
FIG. 4 is a block diagram of an example embodiment of an apparatus in accordance with the disclosed subject matter.

FIG. 4 is a block diagram of an example embodiment of an apparatus 400 in accordance with the disclosed subject matter. FIG. 4 is separated into two parts (FIG. 4a, and FIG. 4b) to reduce the visual clutter caused by the number of bounding boxes used to illustrate portions of the apparatus 400 (e.g., the shielding tunnel 404, etc.). Specifically, FIG. 4b highlights the individual portions or segments of the shielding tunnel 404. These two parts (FIGS. 4a and 4b) will be discussed as if they occurred on a single sheet of paper.

Modern integrated circuit or semi-conductor manufacture frequently involves a three dimensional layout, in which layers of metal (e.g., copper, etc.) are stacked horizontally one atop each other and are often separated by layers of insulator material (e.g., oxide, etc.). These metal layers, or more accurately portions of the metal layers, often form the wires used to transmit electrical signals from one part of the chip to another. These metal layers are often connected vertically by the use of channels or conduits known as interconnects or "vias" (here used as a technical term of art; e.g., vias 426) that "punch" through the semiconductor material separating the metal layers to connect two or more metal layers.

In one embodiment, the apparatus 400 may include at least three metal layers. In some embodiments, these metal layers may be referred to as a top metal layer 420, a middle metal layer 422, and a bottom metal layer 424. It is understood that the terms "top" and "bottom" are relative orientative terms and do not mandate or limit the disclosed subject matter to an absolute orientation (e.g., the apparatus 400 may be turned upside down such that the "top" metal layer 420 is closest to the ground, etc.). It is also understood that the terms "top", "middle" and "bottom" are relative to each other and not to the apparatus as a whole. In various embodiments, a fourth metal layer may exist above the top metal layer 420; likewise with the bottom metal layer 424. In another embodiment, the three metal layers 420, 422, and 424 may be the lowest three metal layers of a six metal layer apparatus. And, so on.

In various embodiments, the apparatus 400 may include seven metal layers. In such an embodiment, metal layers 1, 2, 3, and 7 (as counted from the bottom or substrate of the apparatus 400) may be reserved for the routing of digital data and control signal routing. In such an embodiment, the bottom metal layer 424 may include a portion of metal layer 4; the middle metal layer 422 may include a portion of metal layer 5; and the top metal layer 420 may include a portion of metal layer 6.

In another embodiment, the spacing in between the signals (e.g., power signals 412 and 414, and clock signal 410) may be increased, for example to reduce interconnect capacitance. In such an embodiment, the bottom metal layer 424 may include a portion of metal layer 2; the middle metal layer 422 may include a portion of metal layer 4; and the top metal layer 420 may include a portion of metal layer 6.

In various embodiments, the apparatus may include a clock channel 402 and a shielding tunnel 404. In this context, the term "channel" means "a path for electrical current".

In some embodiments, the clock channel 402 may be configured to carry the clock signal 410. In various embodiments, the clock signal 410 may include a pair of differential clock signals, as described above. In one embodiment, the clock channel 402 may include a portion of a metal layer (e.g., a portion of the middle metal layer 422, etc.).

In various embodiments, the shielding tunnel 404 may be configured to shield the clock channel 402 from other signals (e.g., data and control signals, etc.) routed on the apparatus 400. In some embodiments, the shielding tunnel 404 may shield the clock channel 402 in at least four directions (e.g., above, below, and on two sides; etc.). In one embodiment, the shielding tunnel 404 may form a substantially rectangular tube or channel forming a path for the power signals 412 and 414. In such an embodiment, substantially in the middle of the shielding tunnel 404 the clock channel 402 may be placed. It is understood, that the shielding tunnel 404 may not be physically contiguous.

In some embodiments, the shielding tunnel 404 may include two portions, wherein each of the portions is substantially electrically contiguous and provides a path for an electrical signal. In various embodiments, the shielding tunnel 404 may include a U-shaped power channel portion 406 and an enclosing power channel portion 408.

In one embodiment, the shielding tunnel 404 may include a U-shaped power channel portion 406 configured to carry or provide an electrical path or route for a first power signal. In various embodiments, the power signal may include the negative power signal 414; although, it is understood that the above is merely one illustrative example to which the disclosed subject matter is not limited. In some embodiments, the U-shaped power channel 406 may be configured to provide at least three sides of the shielding tunnel 404. In such an embodiment, the U-shaped power channel 406 may be configured to shield the clock signal 410 or signal transmitted via the clock channel 402 from electrical interference from three sides. In the illustrated example, the U-shaped power channel 406 may shield the clock signal 410 from the bottom and two sides; although, it is understood that the above is merely one illustrative example to which the disclosed subject matter is not limited.

In various embodiments, the shielding tunnel 404 may include an enclosing power channel portion 408. In such an embodiment, the enclosing power channel 408 may be configured to carry or provide an electrical route for a second power signal. In various embodiments, the power signal may include the positive power signal 412; although, it is understood that the above is merely one illustrative example to which the disclosed subject matter is not limited. In some embodiments, the enclosing power channel 408 may provide a fourth or surrounding side to the shielding tunnel 404. In various embodiments, the enclosing power channel 408 may be configured to, in conjunction with the U-shaped power channel 406, to surround or bound the clock channel 402.

In various embodiments, the top metal layer 420 may be substantially thicker than the middle metal layer 422 or the bottom metal layer 424. In such an embodiment, the top metal layer 420 may provide or carry both the positive power signal 412 and the negative power signal 414. In such an embodiment, the top metal layer 420 may be configured to provide power to the repeaters of the apparatus (e.g., repeaters 260 of FIGS. 2 and 3), in addition to shielding the clock channel 402. In various embodiments, the thicker top metal layer 420 may also provide a lower resistance and reduce the voltage/current drop across the power channel.

In various embodiments, the U-shaped power channel 406 may include only a portion of two metal layers (e.g., the bottom metal layer 424 and the middle metal layer 422), as opposed to the illustrated U-shaped power channel 406 that includes portions of three metal layers. In such an embodiment, the enclosing power channel 408 may include the entire portion of the third metal layer (e.g., top metal layer 420) included by the shielding tunnel 404. In such an embodiment, the top metal layer 420 portion of the shielding tunnel 404 may not be electrically coupled with the middle metal layer 422 by interconnects or vias 426.

In various embodiments, the portion of the shielding tunnel 404 configured to carry or route the positive power signal 412 may be referred to as the positive power channel (illustrated as enclosing power channel 408; although, it is understood that the above is merely one illustrative example to which the disclosed subject matter is not limited). In one embodiment, the portion of the shielding tunnel 404 configured to carry or route the negative power signal 414 may be referred to as the negative power channel (illustrated as U-shaped power channel 406; although, it is understood that the above is merely one illustrative example to which the disclosed subject matter is not limited).

FIG. 5 is a flow chart of an example embodiment of a technique 500 in accordance with the disclosed subject matter. In various embodiments, the technique 500 may be employed by systems or apparatuses such as those illustrated by FIGS. 1, 2, 3, and 4. Although, it is understood that the above are merely a few illustrative examples to which the disclosed subject matter is not limited.

Block 502 illustrates that, in one embodiment, a clock signal may be transmitted, along a clock channel, to at least one logic block, as described above. In various embodiments, transmitting may include transmitting a pair of differential clock signals, as described above. In various embodiments, transmitting may include transmitting a clock signal with a frequency of at least 1 GHz such that the clock signal experiences less than a 40 pico-second peak-to-peak clock jitter per 20 millimeters of clock channel, as described above. In some embodiments, the action(s) illustrated by this block may be performed by or involve the clock generator 202 of FIGS. 2 and 3, or the clock signals 210 of FIG. 2, clock signal 310 of FIG. 3, or clock signal(s) 410 of FIG. 4, as described above.

Block 504 illustrates that, in one embodiment, at least two power signals may be transmitted, along a shielding tunnel, as described above. In various embodiments, the two power signals may include a positive power signal and a negative power signal, as described above. In some embodiments, transmitting may include a positive power channel and a negative power channel, as described above.

In one embodiment, transmitting may include transmitting a first power signal via or along a U-shaped power channel, as described above. In various embodiments, this U-shaped power channel may shield the clock signal on at least three sides, as described above. In some embodiments, transmitting may include transmitting a second power signal via an enclosing power channel, as described above. In such an embodiment, the enclosing power channel may shield the clock signal on a fourth side, as described above.

In various embodiments, the shielding tunnel used to transmit the power signals may include a plurality of metal layers, as described above. In one embodiment, the metal layers may include a top metal layer, a middle metal layer, and a bottom metal layer (wherein the terms "top", etc. are relative), as described above. In some embodiments, the top metal layer may be thicker than either of the other two metal layers, as described above.

In some embodiments, the action(s) illustrated by this block may be performed by or involve a power supply, or the power signals 212 and 214 of FIGS. 2 and 3, or the power signal(s) 412 and 414 of FIG. 4, or the shielding tunnel 404, U-shaped power channel 406 or enclosing power tunnel 408, as described above. Although, it is understood that the above are merely a few illustrative examples to which the disclosed subject matter is not limited.

Block 506 illustrates that, in one embodiment, the clock signal may be retransmitted by at least one clock repeater, as described above. In various embodiments, the clock repeater may be powered by the transmitted power signals, as described above. The clock repeaters may be configured to be powered by the top metal layer of the shielding tunnel, as described above. In some embodiments, the action(s) illustrated by this block may be performed by or involve a clock repeater 206 of FIGS. 2 and 3, or the power signal(s) 412 and 414 of FIG. 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
   a clock channel:
      configured to carry a clock signal, and
      comprising a portion of a metal layer of an integrated circuit; and
   a shielding tunnel:
      configured to shield, in at least four directions, the clock channel from other signals, and
      comprising portions of a at least three metal layers of the integrated circuit.

2. The apparatus of claim 1 wherein the shielding tunnel comprises:
   a positive power channel configured to carry a positive power signal (Vdd), and
   a negative power channel configured to carry a negative power signal (Vss).

3. The apparatus of claim 1 wherein the shielding tunnel includes:
   a U-shaped power channel configured to carry a first power signal.

4. The apparatus of claim 3 wherein the shielding tunnel includes:
   an enclosing power channel configured to:
      provide a portion of a fourth side of the shielding tunnel, wherein the U-shaped power channel provides at least a first side, a second side, and a third side of the shielding tunnel, and
      carry a second power signal.

5. The apparatus of 1 wherein the clock channel is configured to carry a pair of differential clock signals.

6. The apparatus of 1 wherein the clock channel is configured to carry a clock signal having a frequency of at least one gigahertz (1 GHz) with a channel-induced clock jitter of less than 40 pico-seconds (ps) peak-to-peak per 20 millimeters of clock channel.

7. The apparatus of 1 wherein the shielding tunnel comprises portions of a top metal layer, a middle metal layer, and a bottom metal layer; and
   wherein the clock channel comprises a portion of the middle metal layer.

8. The apparatus of 1 further comprising:
   at least one clock repeater configured to receive the clock signal and retransmit the clock signal with increased power.

9. The apparatus of 8 wherein the shielding tunnel is configured to provide power to the clock repeater(s).

10. The apparatus of 1 wherein the shielding tunnel includes:
    a portion of a bottom metal layer,
    a portion of a middle metal layer, and
    a portion of a top metal layer; and
    wherein the portion of the top metal layer is substantially thicker than either the bottom or middle metal layers and configured to provide power to the at least one clock repeater, and
    wherein the at least one clock repeater is configured to receive the clock signal and retransmit the clock signal with increased power.

11. A method comprising:
    transmitting a clock signal, along a clock channel, to at least one logic block;
    transmitting at least two power signals, along a shielding tunnel, wherein the shielding tunnel is configured to shield the clock signal from electrical interference; and
    retransmitting, by at least one clock repeater, the clock signal, wherein the clock repeater is powered by the transmitted power signals.

12. The method of claim 11 wherein transmitting at least two power signals includes:
    transmitting a positive power signal along a positive power channel of the shielding tunnel; and
    transmitting a negative power signal along a negative power channel of the shielding tunnel.

13. The method of claim 11 wherein transmitting at least two power signals includes:
    transmitting a first power signal of the at least two power signals along a U-shaped power channel.

14. The method of claim 11 wherein the shielding tunnel includes:
    a U-shaped power channel configured to provide at least a first side, a second side, and a third side of the shielding tunnel; and
    an enclosing power channel configured to:
       provide a portion of a fourth side of the shielding tunnel, and
       carry a second power signal of the at least two power signals.

15. The method of claim 11 wherein transmitting the clock signal includes transmitting a pair of differential clock signals.

16. The method of claim 11 wherein the shielding tunnel comprises portions of a top metal layer, a middle metal layer, and a bottom metal layer; and
    wherein the clock channel comprises a portion of the middle metal layer.

17. The method of claim 11 wherein the shielding tunnel includes:
    a portion of a bottom metal layer,
    a portion of a middle metal layer, and
    a portion of a top metal layer; and
    wherein the portion of the top metal layer is substantially thicker than either the bottom or middle metal layers and configured to provide power to the at least one clock repeater, and
    wherein the at least one clock repeater is configured to receive the clock signal and retransmit the clock signal with increased power.

18. An integrated circuit comprising:
    a clock generator:
       configured to generate a clock signal;
    a plurality of logic blocks:
       configured to perform synchronous logic operations, and
       employ the clock signal to synchronize the logic operations;
    a plurality of clock repeaters:
       configured to receive the clock signal and retransmit the clock signal with increased power;
    a clock channel:
       configured to carry a clock signal; and
    a shielding tunnel:
       configured to shield, in at least four directions, the clock channel from other electrical interference, and
       provide power to the clock repeaters.

19. The integrated circuit of claim 18 wherein the shielding tunnel includes:
a plurality of metal layers,
wherein a first metal layer is substantially thicker than the other metal layers, and
wherein the first metal layer is configured to provide power to the clock repeaters.

20. The integrated circuit of claim 18 wherein the shielding tunnel includes:
a U-shaped power channel configured to:
carry a first power signal, and
shield the clock channel on at least three sides; and
an enclosing power channel configured to:
carry a second power signal, and
shield the clock channel on a fourth side.

\* \* \* \* \*

UNITED STATES PATENT AND TRADEMARK OFFICE
CERTIFICATE OF CORRECTION

| | | |
|---|---|---|
| PATENT NO. | : 7,839,161 B2 | Page 1 of 1 |
| APPLICATION NO. | : 12/555564 | |
| DATED | : November 23, 2010 | |
| INVENTOR(S) | : Afshin Momtaz | |

It is certified that error appears in the above-identified patent and that said Letters Patent is hereby corrected as shown below:

In column 9, line 37, in claim 5, delete "1" and insert -- claim 1 --, therefor.

In column 9, line 39, in claim 6, delete "1" and insert -- claim 1 --, therefor.

In column 9, line 44, in claim 7, delete "1" and insert -- claim 1 --, therefor.

In column 9, line 50, in claim 8, delete "1" and insert -- claim 1 --, therefor.

In column 9, line 54, in claim 9, delete "8" and insert -- claim 8 --, therefor.

In column 9, line 56, in claim 10, delete "1" and insert -- claim 1 --, therefor.

Signed and Sealed this
Fifteenth Day of March, 2011

David J. Kappos
*Director of the United States Patent and Trademark Office*